(12) United States Patent
Hung

(10) Patent No.: US 8,662,475 B2
(45) Date of Patent: Mar. 4, 2014

(54) BALL VALVE GASKET STRUCTURE

(75) Inventor: Kuo-Yu Hung, New Taipei (TW)

(73) Assignee: Lan Shiuon PTFE Industry Co., Ltd. (TW)

( * ) Notice: Subject to any disclaimer, the term of this patent is extended or adjusted under 35 U.S.C. 154(b) by 0 days.

(21) Appl. No.: 13/546,042

(22) Filed: Jul. 11, 2012

(65) Prior Publication Data

US 2014/0014867 A1 Jan. 16, 2014

(51) Int. Cl.
*F16K 5/00* (2006.01)

(52) U.S. Cl.
USPC ............................................ 251/314; 251/363

(58) Field of Classification Search
USPC .................... 251/314, 315.01, 359, 361, 363
See application file for complete search history.

(56) References Cited

U.S. PATENT DOCUMENTS

| | | | | |
|---|---|---|---|---|
| 556,037 A | * | 3/1896 | Swiss ............................ | 251/357 |
| 1,246,787 A | * | 11/1917 | Rosner ...................... | 123/188.8 |
| 2,369,025 A | * | 2/1945 | Cummings ................ | 123/188.8 |
| 2,868,497 A | * | 1/1959 | Graham ........................ | 251/172 |
| 5,170,993 A | * | 12/1992 | Bonetti ........................ | 251/368 |
| 6,116,575 A | * | 9/2000 | Ahn .............................. | 251/314 |
| 6,772,993 B1 | * | 8/2004 | Miller et al. ................. | 251/363 |

* cited by examiner

*Primary Examiner* — John K Fristoe, Jr.
*Assistant Examiner* — R. K. Arundale
(74) *Attorney, Agent, or Firm* — Schmeiser, Olsen & Watts, LLP

(57) ABSTRACT

A ball valve gasket structure includes a housing base having an accommodating area and a position limit area; a leakproof washer installed in the position limit area; a ring-shaped slide unit having a ring-shaped steel plate and a ring-shaped graphite plate installed in the accommodating area, and both top and bottom sides are ring-shaped steel plates of the slide unit, and the ring-shaped steel plate at the bottom side abuts the bottom of the accommodating area, and the other ring-shaped slide unit has an arc surface portion disposed at the internal periphery; and a cover coupled to the housing base for sealing the slide unit. The ball valve gasket structure can be used together with a ball valve to achieve the slide assisting effect, improving service life, and facilitating installation and disassembly.

2 Claims, 4 Drawing Sheets

A-A

B-B

BALL VALVE GASKET STRUCTURE

FIELD OF TECHNOLOGY

The present invention relates to a ball valve gasket structure, in particular to the ball valve gasket structure used together with a ball valve to assist moving a ball and provide a slide assisting effect by means of a plurality of ring-shaped steel plates and ring-shaped graphite plates of a ring-shaped slide unit, so as to improve service life and facilitate installation, disassembly and manufacture.

BACKGROUND

In general, a conventional ball valve gasket is installed between a valve and a ball to provide a slide assisting effect during the use of the ball valve gasket, and the conventional gasket is mainly divided into two types, respectively: a metal gasket and a non-metal gasket.

However, the non-metal gasket comes with less strength and rigidity and thus may be damaged easily when it is used under the conditions of high temperature and high pressure for a long time. On the other hand, although the metal gasket can overcome the aforementioned drawback of the non-metal gasket, the metal gasket and the ball are rubbed with each other, so that the gasket and the ball may be worn out or damaged easily. In addition, such gasket cannot be replaced by itself, but it is necessary to replace the whole set of gasket and ball in order to maintain the air tightness effectively. Obviously, the non-metal or metal gasket cannot meet the requirement for the slide assisting effect or achieve the effects of extending the service life of the gasket or installing and removing the gasket easily. In addition, the manufacture of the metal gasket requires a more complicated procedure and takes a longer time.

Therefore, it is a main subject of the present invention to provide a ball valve gasket structure that can achieve the slide assisting effect, improve service life, and facilitate installation, disassembly and manufacture.

SUMMARY

In view of the aforementioned drawbacks of the conventional aforementioned ball valve gasket structure, the inventor of the present invention based on years of experience in the related industry to conduct extensive researches and experiments, and finally developed a ball valve gasket structure, in hope of achieving the slide assisting effect, improving service life, and facilitating installation, disassembly and manufacture.

It is a primary objective of the present invention to provide a ball valve gasket structure used together with a ball valve, wherein a plurality of ring-shaped steel plates and a plurality of ring-shaped graphite plates of a ring-shaped slide unit are used to assist moving a ball, so as to achieve the slide assisting effect, improving service life, and facilitating installation and disassembly.

To achieve the aforementioned and other objectives, the present invention provides a ball valve gasket structure comprising: a housing base, having an accommodating area enclosed within the housing base, and a position limit area enclosed within the bottom side of the housing base; a leakproof washer, installed in the position limit area on the bottom side of the housing base; and a ring-shaped slide unit, installed in the accommodating area, and including a plurality of ring-shaped steel plates and ring-shaped graphite plates stacked on one another, such that both of the top and bottom sides of the slide unit are ring-shaped steel plates, and the ring-shaped steel plate on the bottom side abuts the bottom of the accommodating area, and the ring-shaped slide unit having an arc surface portion is disposed at an inner periphery of the ring-shaped slide unit; and a cover, coupled to the housing base for sealing the slide unit, such that the top side of the cover can be bent from an external sidewall rim of the accommodating area and snapped, and the bottom side of the cover abuts the ring-shaped steel plate on the top side of the slide unit.

In a preferred embodiment of the present invention, each ring-shaped steel plate and each ring-shaped graphite plate have a concave arc surface formed at the internal periphery of the each ring-shaped steel plate and each ring-shaped graphite plate separately. After each ring-shaped steel plate and each ring-shaped graphite plate are stacked with each other, adjacent concave arc surfaces are combined to form an arc surface portion disposed at the internal periphery of the ring-shaped slide unit.

In a preferred embodiment of the present invention, the top side of the cover has a recess area enclosed within the external periphery of the cover, so that the external sidewall rim of the accommodating area can be bent and snapped to the recess area.

Therefore, the ball valve gasket structure of the present invention can be used together with a ball valve, and each ring-shaped steel plate and each ring-shaped graphite plate of a ring-shaped slide unit are used to assist moving a ball, so as to achieve the slide assisting effect, improving service life, and facilitating installation and disassembly.

DETAILED DESCRIPTION

The objects, characteristics and effects of the present invention will become apparent with the detailed description of the preferred embodiments and the illustration of related drawings as follows.

Figure 1:
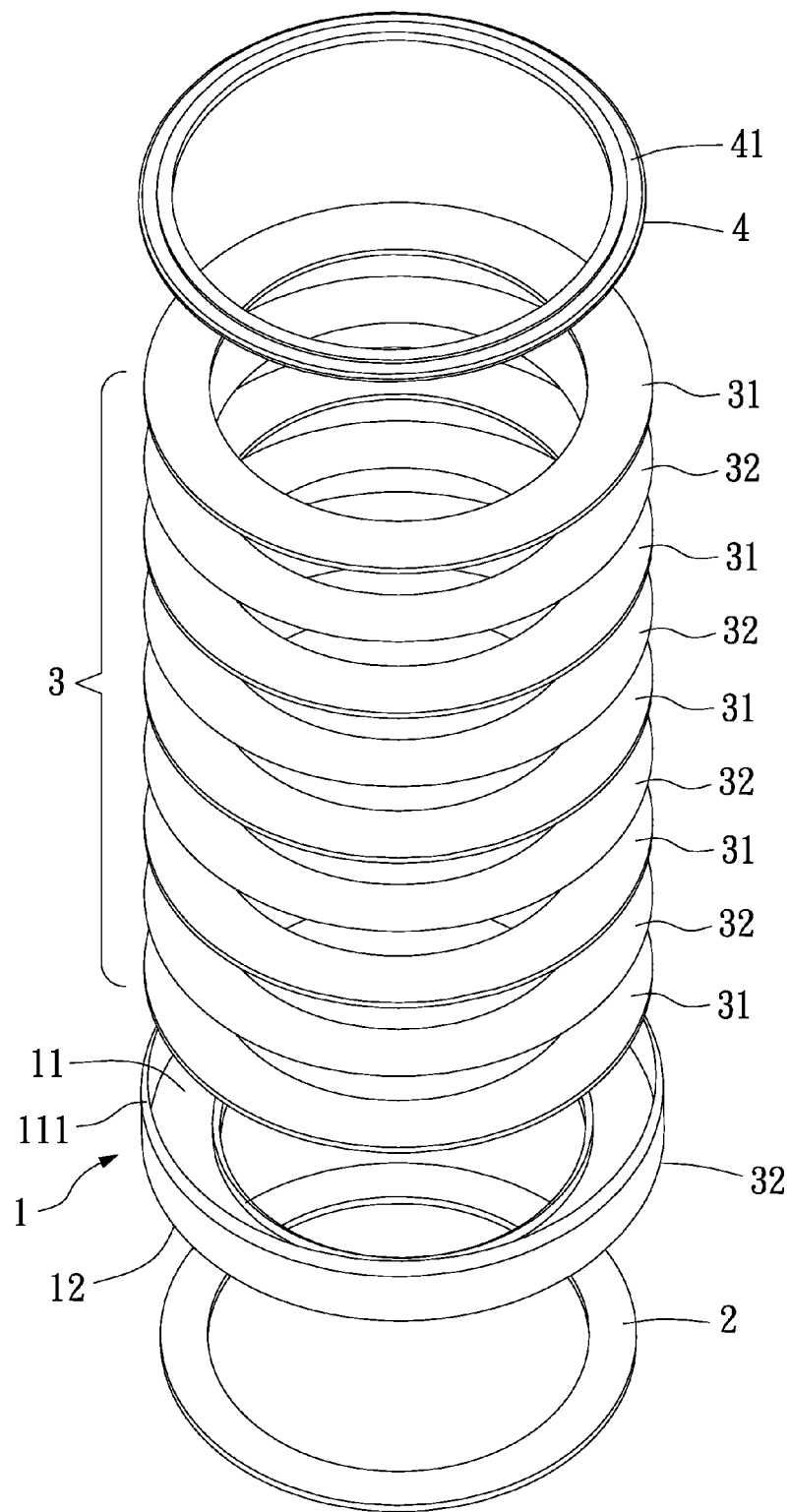
FIG. 1 is an exploded view of the present invention.
Figure 2:
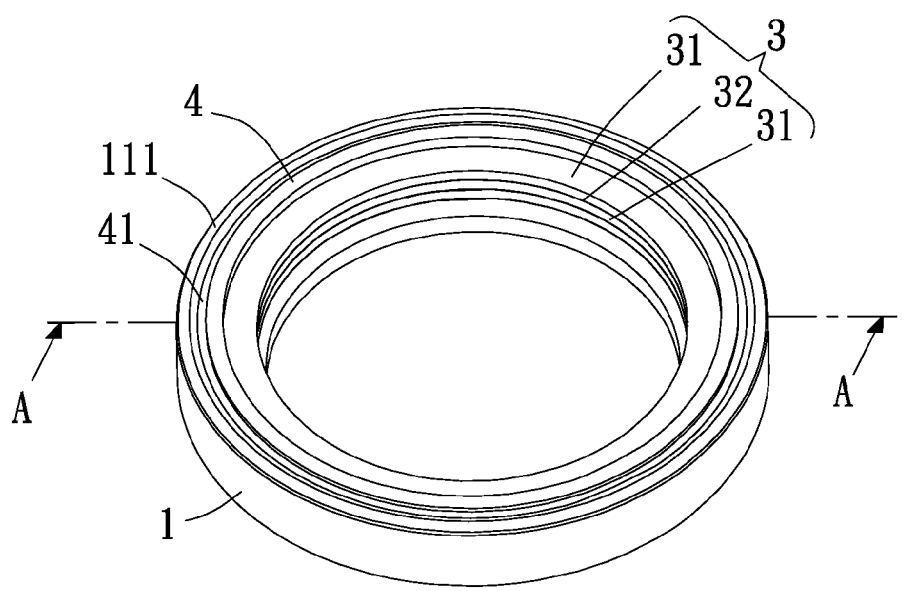
FIG. 2 is a perspective view of the present invention.
Figure 3:
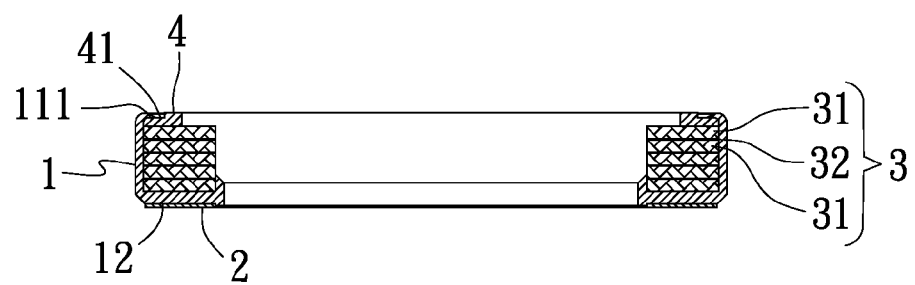
FIG. 3 is a cross-sectional view of Section A-A as depicted in FIG. 2.
Figure 4:
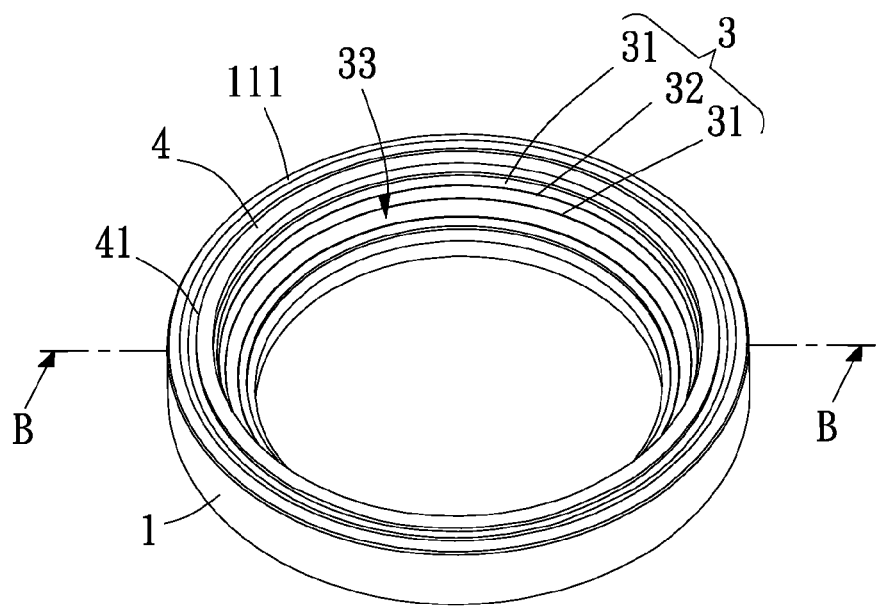
FIG. 4 is a perspective view of an arc surface portion of the present invention.

With reference to FIGS. 1 to 6 for an exploded view, a perspective view, a cross-sectional view of Section A-A (as depicted in FIG. 2), a perspective view of an arc surface portion, and a cross-sectional view of Section B-B (as depicted in FIG. 4) of a ball valve gasket structure in accordance of a preferred embodiment of the present invention respectively, the ball valve gasket structure comprises a housing base 1, a leakproof washer 2, a ring-shaped slide unit 3 and a cover 4.

The housing base 1 has an accommodating area 11 enclosed within the housing base 1, and a position limit area 12 enclosed within the bottom side of the housing base 1.

The leakproof washer 2 is installed in the position limit area 12 on the bottom side of the housing base 1.

The ring-shaped slide unit 3 is installed in the accommodating area 11 and includes a plurality of ring-shaped steel plates 31 and ring-shaped graphite plates 32 stacked on one another, such that both of the top and bottom sides of the slide unit 3 are ring-shaped steel plates 31, and the ring-shaped steel plate 31 on the bottom side abuts the bottom of the accommodating area 11.

The cover 4 is coupled to the housing base 1 for sealing the slide unit 3, and a recess area 41 is disposed at the external periphery of the top side of the cover 4, such that the top side of the cover 4 can be bent from an external sidewall rim of the accommodating area 11 and snapped to the recess area 41, and the bottom side of the cover 4 abuts the ring-shaped steel plate 31 on the top side of the slide unit 3.

Figure 5:
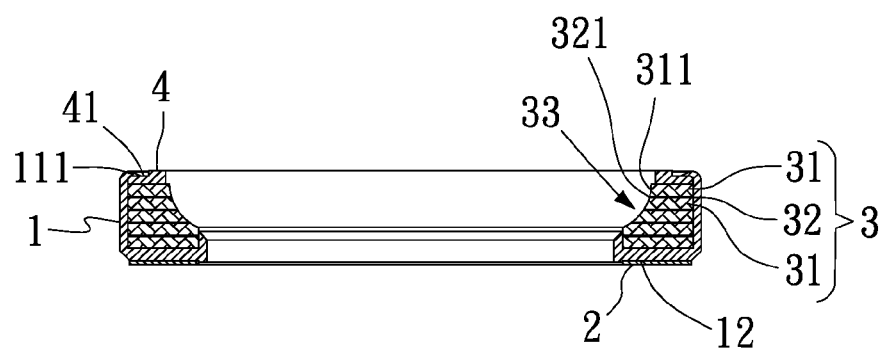
FIG. 5 is a cross-sectional view of Section B-B as depicted in FIG. 4.
Figure 6:
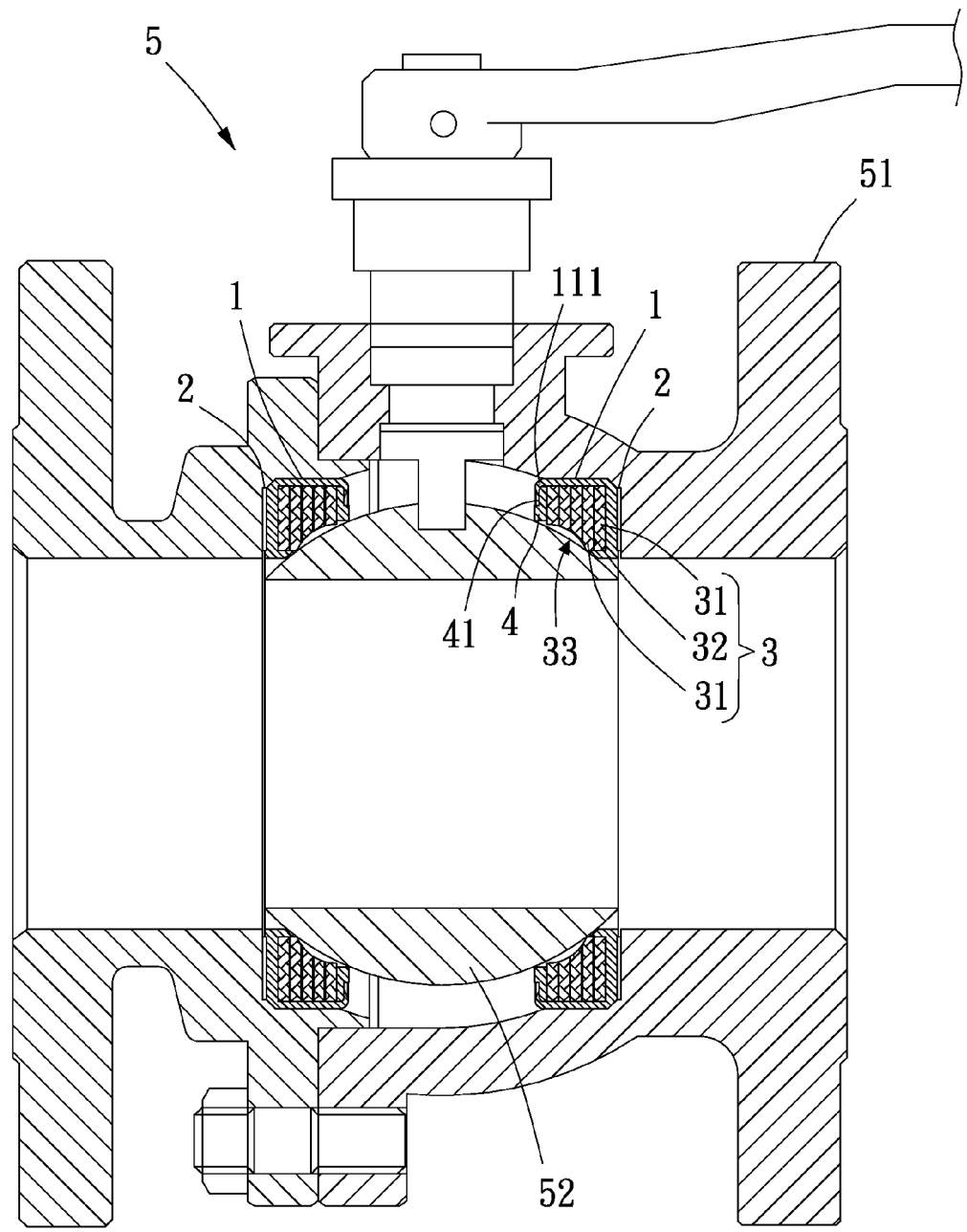
FIG. 6 is a schematic view of an application of the present invention.

During the manufacture, each ring-shaped steel plate 31 and each ring-shaped graphite plate 32 are stacked on one another alternately and pressed to form a ring-shaped slide unit 3, so that a ring-shaped graphite plate 32 is clamped between two ring-shaped steel plates 31, and both top and bottom sides of the slide unit 3 are ring-shaped steel plates 31, and then the ring-shaped slide unit 3 is installed in the accommodating area 11, and the ring-shaped steel plate 31 on the bottom side of the slide unit 3 abuts the bottom of the accommodating area 11, and then the bottom side of the cover 4 abuts the ring-shaped steel plate 31 on the top side of the slide unit 3, and bent from the external sidewall rim 111 of the accommodating area 11 and snapped to the recess area 41, so that after the cover 4 is coupled to the housing base 1, the slide unit 3 is sealed into the accommodating area 11, and finally a concave arc surface 311, 321 is formed separately at the internal periphery of each of the ring-shaped steel plates 31 and the ring-shaped graphite plates 32 by a milling machine or a lathe to form, so that the internal periphery of the ring-shaped slide unit 3 is coupled by each of the adjacent concave arc surfaces 311, 321 to form an arc surface portion 33 (as shown in FIGS. 4 and 5), so as to achieve the easy construction and manufacture effects. The ball valve gasket structure of the invention can be used together with a ball valve 5 (as shown in FIG. 6), and the gasket of the present invention is installed between a valve 51 and a ball 52 of the ball valve 5, and the leakproof washer 2 is installed between the position limit area 12 of the housing base 1 and the valve 51. During an operation, each ring-shaped steel plate 31 and each ring-shaped graphite plate 32 of the ring-shaped slide unit 3 are used to provide a slide assisting effect when the ball 52 is rotated, and the leakproof washer 2 is used to preventing a gas or a liquid passing through the ball valve 5 from being leaked to achieve an effective airtight effect. Due to the characteristics such as the wear resistance, high temperature resistance and deformation resistance of the ring-shaped graphite plate 32, the service life can be improved. In addition, the gasket can be replaced directly when needed.

In summation of the description above, the present invention can be used together with the ball valve, and each of the ring-shaped steel plates and ring-shaped graphite plates of the ring-shaped slide unit can assisting moving the ball to achieve the slide assisting effect, improve service life, and facilitate installation, disassembly, and manufacture. The products manufactured according to the present invention can fully meet the current market requirements, and the present invention complies with the patent application requirements While the invention has been described by means of specific embodiments, numerous modifications and variations could be made thereto by those skilled in the art without departing from the scope and spirit of the invention set forth in the claims.

What is claimed is:

1. A ball valve gasket structure, comprising:
   a housing base, having an accommodating area enclosed within the housing base, and a position limit area enclosed within a bottom side of the housing base;
   a leakproof washer, installed in the position limit area on the bottom side of the housing base;
   a ring-shaped slide unit having a top side and a bottom side, installed in the accommodating area, and including a plurality of ring-shaped steel plates and ring-shaped graphite plates stacked on one another, such that both of the top and bottom sides of the ring-shaped slide unit are ring-shaped steel plates, and the ring-shaped steel plate on the bottom side abuts a bottom of the accommodating area, and the ring-shaped slide unit having an arc surface portion disposed at an inner periphery of the ring-shaped slide unit; and
   a cover, coupled to the housing base for sealing the ring-shaped slide unit, such that a top side of the cover is bent from an external sidewall rim of the accommodating area and then snapped, and a bottom side of the cover abuts the ring-shaped steel plate on the top side of the ring-shaped slide unit;
   wherein the top side of the cover has a recess area enclosed within an external periphery of the cover, such that the external sidewall rim of the accommodating area is bent and then snapped onto the recess area.

2. The ball valve gasket structure of claim 1, wherein each ring-shaped steel plate and each ring-shaped graphite plate have a concave arc surface formed at the internal periphery of each ring-shaped steel plate and each ring-shaped graphite plate respectively, and after each ring-shaped steel plate and each ring-shaped graphite plate are stacked with one another, adjacent concave arc surfaces are coupled to form an arc surface portion disposed at the internal periphery of the ring-shaped slide unit.

* * * * *